Nov. 30, 1948.    C. LINDLEY, JR    2,455,072
FRUIT CUTTER AND PITTER WITH ROTARY BLADES
Filed April 3, 1945    2 Sheets-Sheet 1
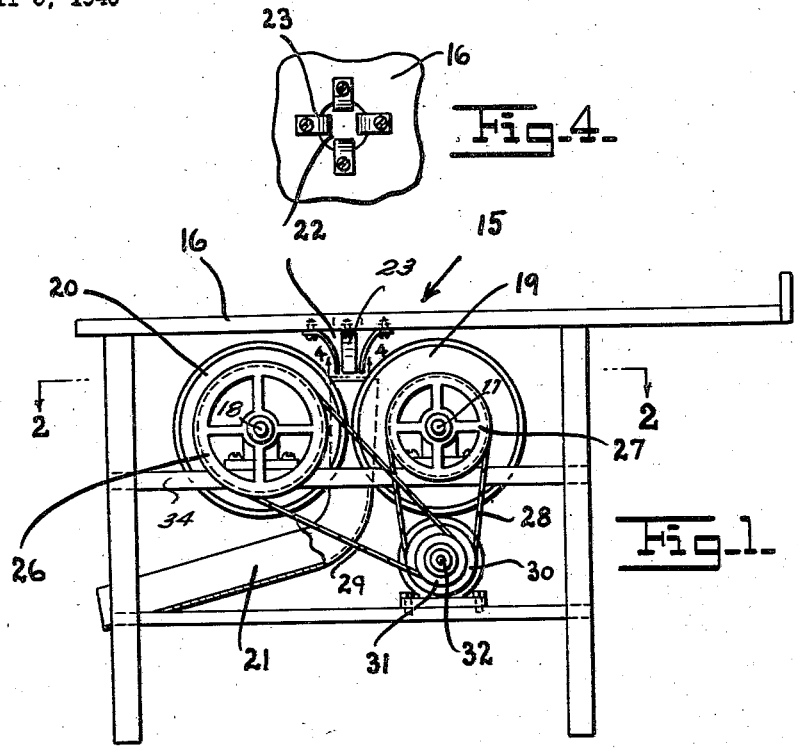
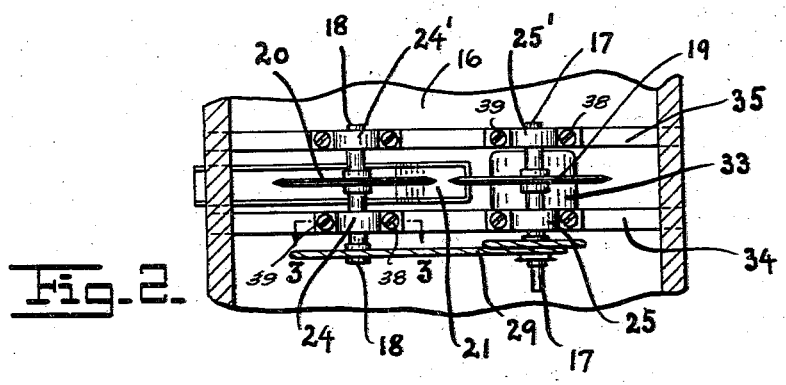
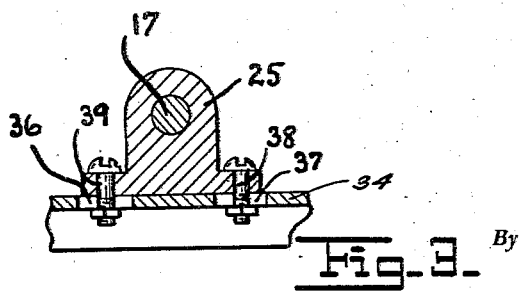
Inventor
Curtis Lindley Jr.

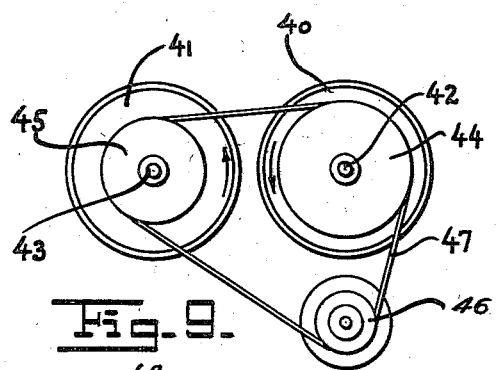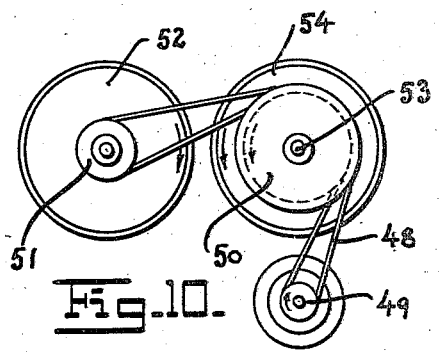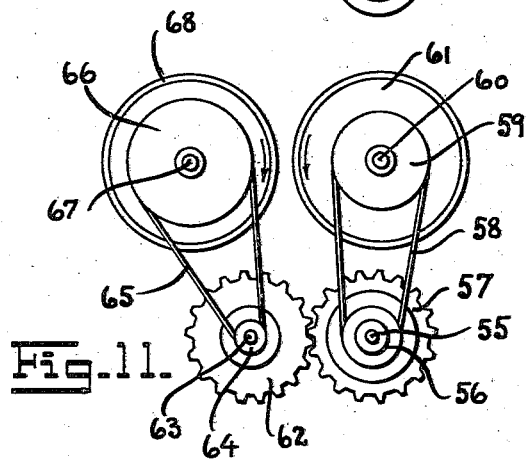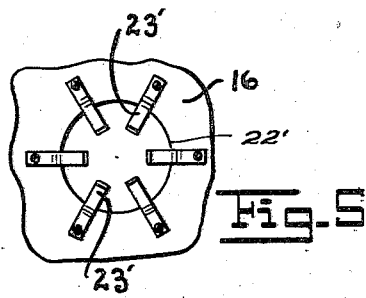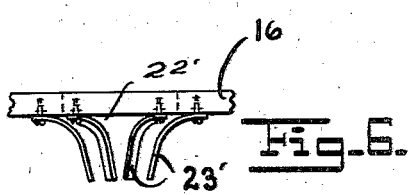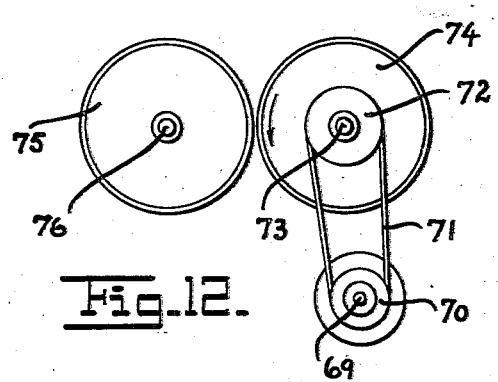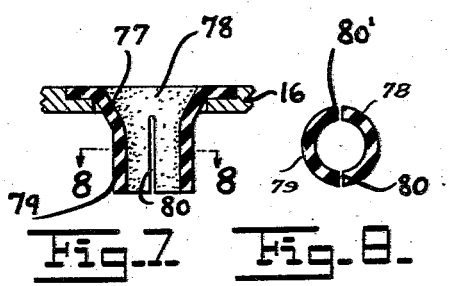

Patented Nov. 30, 1948

2,455,072

UNITED STATES PATENT OFFICE 2,455,072

FRUIT CUTTER AND PITTER WITH ROTARY BLADES

Curtis Lindley, Jr., Empire, Calif.

Application April 3, 1945, Serial No. 586,312

2 Claims. (Cl. 146—73)

This invention relates to a machine for splitting and pitting fruit such as peaches, apricots, etc. for use in canning factories, hotels and other places where large quantities of such fruit is used.

Another object of the invention is to provide a machine having vertically operating circular blades and means for feeding the fruit there against.

A further object of the invention is to provide a fruit cutting machine using rotating circular blades, together with arrangement whereby the blades may be operated in varying relation for cutting or slicing fruits of various kinds.

Other features and advantages will become more readily apparent from the following description and the accompanying illustrative drawings in which:

Figure 1 is a side elevational view of my machine,

Figure 2 is a sectional view taken on line 2—2 of Figure 1,

Figure 3 is a detail sectional view taken on line 3—3 of Figure 2,

Figure 4 is a detail bottom plan view of a feed,

Figure 5 is an enlarged bottom plan view of a feed of a slightly different arrangement, Figure 6 is a side elevational view of Figure 5, Figure 7 is a vertical sectional view of a modified form of feed, Figure 8 is a sectional view taken on line 8—8 of Figure 7, Figure 9 is a diagrammatical view of a blade drive setup, Figure 10 is a similar view indicating a different drive setup, Figure 11 is a detail elevation of a third driving means, and Figure 12 is a like view illustrating the combination of a fixed blade and a rotating blade setup.

In the various views in the drawings and in the following specification like reference characters represent like parts and in which 15, indicates my fruit cutting machine which consists of a table 16, beneath which is a pair of rotatable axles 17 and 18, upon which are parallel aligning cutter blades 19 and 20, the cutting edges of which are very close to one another and beneath which is a chute 21. Projecting down directly below an aperture in the table 16, is a feeding device 22 (or 22′) which comprises a plurality of spring fingers 23 (or 23′) inclining toward one another just above the said blades.

Fixed on said shafts 17 and 18, outwardly of the bearings 24 and 25, are pulleys 26 and 27, upon which the preferably V-belts 28 and 29, operate. Said belts being driven by pulleys 30 and 31, fixed on the shaft 32, driven by a motor 33. The bearings 24 and 24′ and 25 and 25′, are adjustably mounted upon the cross bars 34 and 35, which are provided with slots 36 and 37, through which the bolts 38 and 39, project to permit of said adjustment whereby the blades 19 and 20, may be spaced according to fruit being cut.

As different conditions are required for cutting and pitting different fruits it becomes necessary on occasions to change the relative actions of the cutter blades, therefore in Figure 9 of the drawings I illustrate the cutter blades 40 and 41, operating on axles 42 and 43, upon which are pulleys 44 and 45, and a drive pulley 46 over which the belt 47 is trained, driving the said blades in the directions indicated by the arrows thereon.

In Figure 10 the drive belt 48, operating over the pulleys 49, 50 and 51, drives the blade 52 in the direction shown by the arrow thereon, the pulley 50, being an idler on the shaft 53, does not necessarily drive said shaft or the blade 54, but may be rotated by the frictional action of fruit being cut by the blades 52 and 54.

In Figure 11, the driven shaft 55, has fixed thereon a pulley 56, and a gear 57. The belt 58, operating from the pulley 56, to the pulley 59, on shaft 60, drives the blade 61, in the direction shown by the arrow on that blade. The gear 62, fixed on shaft 63, is provided with a pulley 64, over which the belt 65, is trained, said belt being also trained over pulley 66, on shaft 67, to which blade 68, is fixed, drives said blade in the direction shown by the arrow thereon.

In Figure 12 is shown still another set up in which the drive shaft 69, carries the fixed pulley 70, over which the belt 71, operates and which belt drives the pulley 72, on shaft 73, to which the blade 74, is fixed and said blade is driven in the direction shown by the arrow thereon. In this case the blade 75, is carried by a shaft 76, and is not driven but is merely an idler if loose on said shaft, or it may be fixed thereto as occasion requires.

In Figure 7 of the drawings I show a modification of the fruit feeding device 77, having a funnel or hopper top portion 78, and a depending tubular portion 79, which tubular portion is split transversely as shown at 80 and 80′, whereby one of the cutter blades may operate directly through said slots 80 and 80′ in order that the fruit may be pressed down through the feeder directly upon a cutter blade.

It is obvious that the blades as illustrated in splitting fruits with stones will in splitting the said fruit drag the stones therefrom. It is also obvious that the cutter blades may be provided with saw edges or fluted surfaces (not shown).

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details and parts such as come within the purview of the invention claimed may be resorted to, in actual practice, if desired.

Having described my invention that which I claim to be new and desire to procure by Letters Patent is:

1. A fruit cutter and pitter comprising a table having a top formed with a fruit feeding aperture extending therethrough and supporting legs and cross bracing bars connected between said legs, rotatable aligned cutter blades adjustably supported on said bars for selectively varying the distance between said blades, means for rotating said blades, depending arcuate resilient fruit feeding fingers disposed radially about the aperture in said table top being secured to the under surface thereof, and a discharge chute interposed between and below said cutter blades terminating at its upper end adjacent the lower ends of said resilient feed fingers, whereby fruit fed through the feed aperture in the table top will be held by said fingers in position while cutting and the cut fruit passing immediately to and through said discharge chute.

2. A fruit cutter and pitter comprising a table having a top formed with a fruit feeding seeding aperture extending therethrough and supporting legs and cross bracing bars connected between said legs, rotatable aligned cutting blades adjustably supported on said bars for selectively varying the distance between said blades, means for rotating said blades, concentrically disposed flexible fruit feeding fingers supported by said table top about said fruit feeding aperture in said table top and depending therebelow, a discharge chute interposed between and below said cutting blades terminating at its upper end adjacent the lower ends of said resilient feed fingers, whereby fruit fed through the feed aperture in the table top will be held by said fingers in position while being cut with the cut fruit passing immediately to and through said discharge chute and all of said mechanism being disposed below the working surface of said table top.

CURTIS LINDLEY, Jr.

REFERENCES CITED

The following references are of record in the file of this patent:

UNITED STATES PATENTS

| Number | Name | Date |
|---|---|---|
| 267,320 | Betts | Nov. 14, 1882 |
| 569,838 | Rehm | Oct. 20, 1896 |
| 1,075,547 | Caldwell | Oct. 14, 1913 |
| 1,683,481 | Pease | Sept. 4, 1928 |
| 1,710,421 | Jorgenson | Apr. 23, 1929 |
| 2,288,756 | Thompson | July 7, 1942 |
| 2,370,129 | Asbill, Jr., et al. | Feb. 27, 1945 |